P. PICHON.
PRODUCTION AND DETECTION OF ELECTRIC OSCILLATIONS.
APPLICATION FILED JUNE 25, 1907.

1,180,075.    Patented Apr. 18, 1916.

UNITED STATES PATENT OFFICE.

PAUL PICHON, OF SUDENDE, NEAR BERLIN, GERMANY, ASSIGNOR TO GESELLSCHAFT FÜR DRAHTLOSE TELEGRAPHIE M. B. H., OF BERLIN, GERMANY.

PRODUCTION AND DETECTION OF ELECTRIC OSCILLATIONS.

1,180,075.     Specification of Letters Patent.     Patented Apr. 18, 1916.

Application filed June 25, 1907. Serial No. 380,717.

*To all whom it may concern:*

Be it known that I, PAUL PICHON, a citizen of the Republic of France, residing at Sudende, near Berlin, Germany, have invented certain new and useful Improvements in and Connected with the Production and Detection of Electric Oscillations, of which the following is a full, clear, and exact description, reference had to the accompanying drawing, forming a part of this specification.

This invention relates to an apparatus for testing stations for wireless signaling, which apparatus is intended to render possible not only an exact tuning of all the transmitter and receiver oscillation circuits, but also to allow of the measurement of the wave lengths of adjacent oscillation circuits and the testing of local circuits and detectors of all kinds, as well as the measurement of the coupling of oscillation circuits being rapidly and exactly effected. In order to fulfil the first requirement viz: the exact tuning of the oscillation circuits of the transmitter and the receiver, according to this invention an improved exciter connection is employed. This consists substantially of a circuit containing a source of electromotive force, an automatic interrupter, and means for avoiding sparking at the point of interruption. The source of current and also the self-acting interrupter thus do not lie within the oscillation circuit to be excited; it therefore has an extremely small damping. It is also essential that during the interruption no sparking should occur at the point of interruption, which result may be completely attained by the use of a bifilar wound resistance in parallel with the electromagnet of the automatic interrupter.

With the object of measuring the waves, a means for detecting electromagnetic oscillations is connected with the oscillation circuit. A vacuum tube is preferably employed for this object, which tube is illuminated as soon as the oscillation circuit is in resonance with another oscillation circuit influencing the first named oscillation circuit. The oscillation circuit of the apparatus is preferably calibrated to wave lengths or periods, so that the wave length or period at which the vacuum tube is illuminated can be read off from the apparatus.

A form of construction of the invention is shown in the accompanying drawings.

Figure 1:
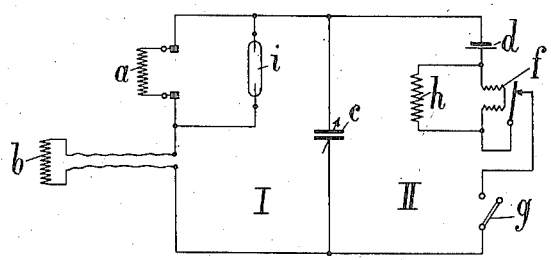
Figure 2:
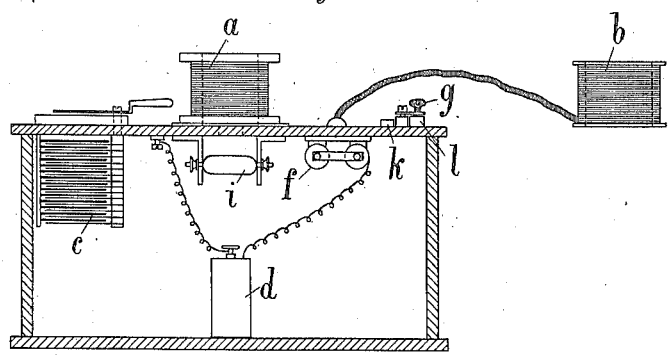
Figure 3:
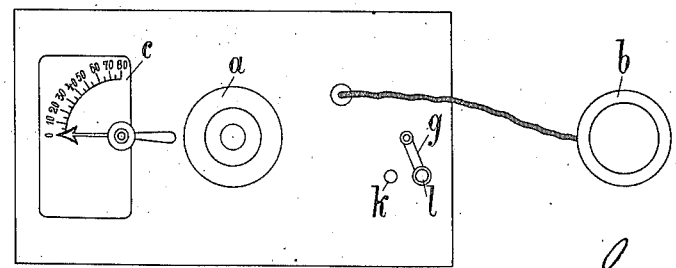

Figure 1 shows the connection of the apparatus. Figs. 2 and 3 show a central elevation and a plan of the apparatus as a commercial article.

As may be seen in Fig. 1, the apparatus consists substantially of an oscillation circuit I which contains two self-induction coils $a$ and $b$ and a condenser $c$. In parallel with the condenser $c$ a second circuit II is connected to the oscillation circuit I, which second circuit contains a source of current $d$, an automatic electromagnetic interrupter $f$ and a switch $g$. As may be seen the oscillation circuit I merely contains the self-induction coils $a$ $b$ and the condenser $c$, *i. e.* neither a source of potential nor a circuit breaking device. This improved construction of the oscillation circuit has the advantage of producing very small damping, which is of very great importance for apparatus of the kind herein described, where it is a question of testing the oscillation circuit or circuits of the transmitting and receiving stations for wireless signaling. The slight damping of the closed oscillation circuit I also has the advantage of enabling a small source of current to be employed for the excitation of the circuit. One or two small dry batteries suffice for this. The capacity of the condenser $c$ is made variable in order to alter the number of oscillations of the closed circuit. The self-induction coil $a$ is preferably removably arranged in the oscillation circuit, so that it may be exchanged for a coil with greater or less self-induction. In this way the range within which the periods may be altered, is considerably enlarged. A non-inductive resistance $h$, for instance a bifilar wound resistance wire is provided in parallel with the magnet coil of the interrupter, with the object of suppressing sparking which commonly arises at the point of interruption. The self-induction coil $b$ of the oscillation circuit is movably connected therewith by means of suitable flexible conductors so that it may be brought into the proximity of the system to be examined in order in this way to set up an inductive coupling with the system. This coupling may as shown be suitably regulated by altering the position of the coil $b$. The excitation of the oscillation circuit takes place, as is readily seen, by closing the switch $g$. A detector $i$ is also connected with the oscillation circuit, which detector indicates the occurrence of electric oscillations in the oscillation circuit I on this oscillation circuit being excited from a transmitter. A vacuum tube is preferably employed as a detector, which tube may contain rarefied air or any other rarefied gas, for instance, helium. Such a tube has the advantage that when the oscillation circuit is used as a transmitter, it may remain coupled with the oscillation circuit, as the small potential then arising in the oscillation circuit does not suffice to make the tube a conductor.

The construction of the separate parts of the apparatus as a commercial article is shown in Figs. 2 and 3. As may be seen in the figures a variable condenser $c$ is arranged in the interior of a closed box, which condenser consists of several pairs of plates, one part of which plates is arranged firmly on the lid of the box while the other part is mounted on a shaft revolubly mounted in the casing cover or box lid. Above the cover or lid the shaft has a handle and an index or pointer which travels over a scale which is preferably marked off in periods or wave lengths. By turning the handle the capacity of the condenser can be suitably altered. Within the box there is also a vacuum tube $i$ which is removably held by the two supports. Above the middle part of the vacuum tube there is a hole through which the vacuum tube may be inspected. It has been found preferable to removably arrange on the lid a tubular self-induction coil $a$ approximately concentrically with this inspection hole, so that it also shuts out the rays of light entering from the outside when the vacuum tube is being observed. Fig. 2 also shows in the interior of the apparatus the coil of the electro-magnetic interrupter $f$ and also a battery or cell $d$, which supplies the current for exciting the oscillation circuit. $b$ is the movable self-induction coil connected with the apparatus, and $g$ the key or switch provided on the lid or cover of the box or case. It is as shown formed as a lever switch and acts in conjunction with the two contacts $k$ and $l$, one of which, $k$, is somewhat lower than the other, $l$. In the position of the key lever shown, the latter lies on the contact $l$ and thus keeps the circuit permanently closed, while in the other position the contact is made by pressing on the lever and in this way Morse signals can be given. Instead of making the condenser gradually variable in its capacity, the self-induction coil may also be suitably formed to enable its self-induction to be gradually altered. It should also be quite self evident that instead of the conductive connection here shown of the circuit II with circuit I and the detector $i$ with the oscillation circuit I, an inductive coupling may also be employed.

In consequence of the above described arrangement the oscillation circuit I may either be used as a transmitter, the switch $g$ being closed, or as a receiver (switch $g$ being opened), in accordance with the work of the station which is being tested.

If it is desired to test the tuning of a circuit which works as a transmitter circuit, it is inductively connected with the latter and used as receiver. The oscillation circuit of the tester is then adjusted until it takes maximum energy; this can be ascertained by the light from the vacuum tube. The length of the waves sent out by the transmitter circuit is then equal to the known wave indicated by the station tester.

If it is desired to test a receiver circuit, the tester is used as a transmitter; it is connected inductively with the receiver circuit and adjusted until the detector of the receiver gives the best effect. Both the circuits (station tester and receiver circuit) will then be tuned to the same wave length.

If a coupled transmitter is set to work on the station tester, the tube of the latter glows at two points on the scale according to the two waves, which are sent out by coupled transmitters. The coupling coefficients are then obtainable from the formula $$K = \frac{\lambda_1 - \lambda_2}{\lambda_0}$$

where K indicates the coupling coefficient, $\lambda_0$ the primary wave, $\lambda_1$ the longer partial wave, $\lambda_2$ the shorter.

Having explained my invention, what I do claim and desire to secure by Letters Patent is:

1. A testing apparatus for producing electric oscillations of such frequencies as occur in antennæ used for wireless telegraphy and telephony comprising a non-interrupted closed high frequency circuit, a source of electromotive force and a mechanically operated interrupter, both the electromotive force and the interrupter being in parallel with one part of the said oscillation circuit substantially as described.

2. A testing apparatus for producing and detecting electric oscillations, of such frequencies as occur in antennæ used for wireless telegraphy and telephony comprising a non-interrupted closed high frequency circuit, a source of electromotive force and a mechanically operated interrupter both the electromotive force and the interrupter being in parallel with one part of the said oscillation circuit, and means electrically connected with the closed oscillation circuit for detecting the electromagnetic waves, substantially as described.

3. A portable testing device for wireless signaling stations, comprising a noninterrupted closed high frequency circuit, a source of electromotive force and a mechanically operated interrupter, both the electromotive force and the interrupter being in parallel with one part of the said oscillation circuit, means for tuning the oscillation circuit calibrated to wave length or periods and means electrically connected with the closed oscillation circuit for detecting the oscillations, substantially as described.

In witness whereof, I hereunto subscribe my name this 13th day of June, A. D. 1907.

PAUL PICHON.

Witnesses:
　HENRY HASPER,
　WOLDEMAR HAUPT.